April 6, 1954

A. MITZEL 2,674,360

DISCHARGE EXTENSION FOR HAY BALERS

Filed Oct. 31, 1952

INVENTOR.
ADAM MITZEL,
BY
McMorrow, Berman + Davidson
ATTORNEYS

Patented Apr. 6, 1954

2,674,360

UNITED STATES PATENT OFFICE 2,674,360

DISCHARGE EXTENSION FOR HAY BALERS

Adam Mitzel, Glenham, S. Dak.

Application October 31, 1952, Serial No. 317,983

3 Claims. (Cl. 193—38)

This invention relates to extensions for hay balers and more particularly to a discharge extension for a hay baler for guiding the bales as they are discharged from the baler and depositing the bales in predetermined position on the ground.

It is among the objects of the invention to provide a discharge extension for a hay baler which will guide the bales discharged from the baler and drop the bales in a predetermined position on the ground, so that each bale lies on a side thereof with the strands which bind it together out of contact with the ground to enable a mechanical loader to easily pick up the bales and to protect the strands or ties from the corrosive or decaying effects of ground moisture and from being cut by rodents; which drops the bales gently to the ground to avoid unduly stretching or breaking the bale ties; which can be installed on an existing baler with no material modification of the baler construction or provided as an integral part of a new baler; and which is simple and durable in construction, economical to manufacture, and effective and efficient in operation.

Figure 1:
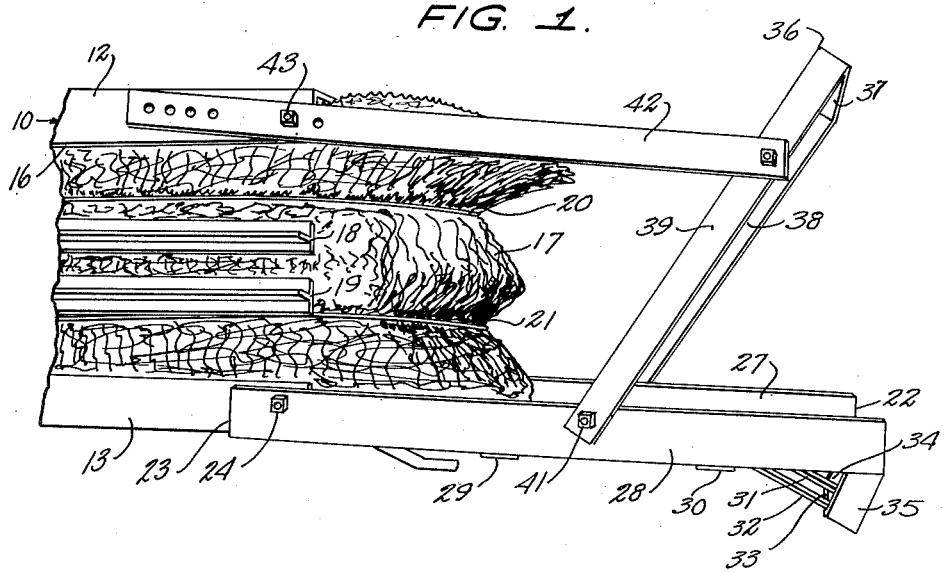
Figure 2:
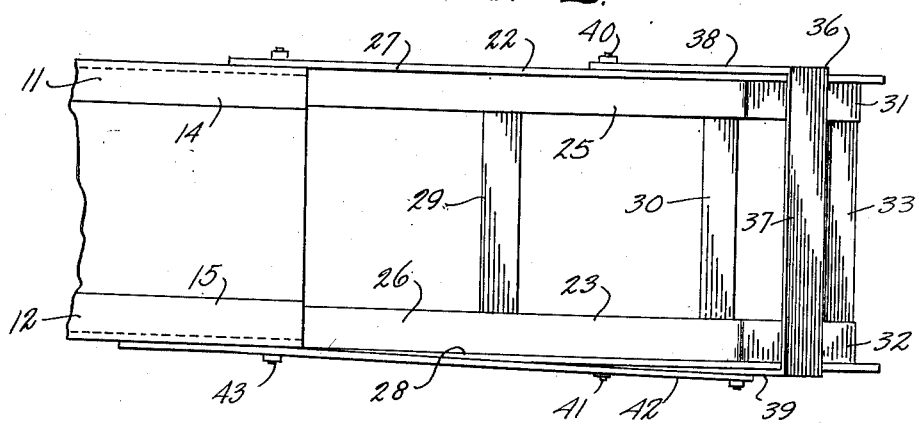

Other objects and advantages will become apparent from a consideration of the following description and the appended claims in conjunction with the accompanying drawing wherein:

Figure 1 is a perspective view of a rear end portion of a hay baler bale box and an extension illustrative of the invention operatively mounted on the bale box; and Figure 2 is a top plan view of the bale box portion and extension illustrated in Figure 1.

The bale box, generally indicated at 10, of the hay baler, comprises a pair of top rails 11 and 12 disposed in spaced apart and substantially parallel relationship to each other and substantially horizontally disposed when the baler is in operative position and a pair of corresponding bottom rails, one of which is indicated at 13 also disposed in spaced apart and substantially parallel relationship to each other and spaced downwardly from and substantially parallel to the corresponding top rails 11 and 12 to provide a bale box having a rectangular cross sectional shape. The top legs 14 and 15 of the top angle iron rails 11 and 12 extend inwardly of the bale box toward each other from the corresponding side legs or flanges at the top of the bale box and the side flanges, as indicated at 16 in Figure 1 for the top rail 12, extend downwardly from the outer edges of the top legs 14 and 15 at the corresponding sides of the bale box. The bottom rails are similarly arranged, having bottom legs or flanges which extend inwardly toward each other from the corresponding side legs at the bottom of the bale box and side legs which extend upwardly from the outer edges of the bottom legs at the correspondingly opposite sides of the bale box. The four angle iron members constituting the top and bottom rails of the bale box constitute guides of right angular cross sectional shape for the longitudinal edges of the bales, as indicated at 17, forced through the bale box.

Bale guides or presses, as indicated at 18 and 19, extend longitudinally of the bale box between the top and bottom rails at the opposite sides of the bale box in spaced apart relationship to each other to hold the side portions of the bales in shape and corresponding bars or plates are disposed between the top rails and between the bottom rails to hold the top and bottom sides of the bales in shape as the bales move rearwardly through the bale box to the discharge end of the box.

As the construction of the bale boxes of hay balers is well known to the art, a more detailed illustration and description of this known structure is considered unnecessary for the purposes of the present disclosure.

In hay balers now in use, the top and bottom rails of the bale box all terminate at the discharge end of the bale box substantially in a common plane perpendicular to the longitudinal center lines of the several rails and, with this construction, the bales are discharged from the discharge end of the bale box in an unpredictable manner, some of the bales being turned so that they stand on end on the ground in an upright position, others being rolled, so that the wire or twine ties, as indicated at 20 and 21, which hold the bales together are disposed against the ground where they are subject to corrosion or decay from ground moisture, or to attack by rodents, and only a portion of the bales being deposited on the ground on the same sides which were their bottom sides as they move through the bale box with their ties disposed above the ground where they are not subject to ground moisture or to attacks by rodents.

It is an object of the present invention to provide an extension at the rear or discharge end of the bale box which will guide the bales as they leave the discharge end of the bale box in a manner such that the bales will be deposited gently on the ground, so as not to unduly stretch or break their ties and will be placed on the same sides which were their bottom sides while in the bale box, so that their ties will be disposed above the ground, thus preventing the loss of a large number of the bales between the baling operation and the later gathering and transporting of the bales to a suitable storage location.

The extension illustrated is particularly adapted for installation on an existing baler and comprises a pair of angle iron members 22 and 23 which extend rearwardly respectively from the bottom rails of the bale box. The member 23, as illustrated in Figure 1, overlaps at its front end the rear end of the bottom rail 13 of the bale box at the outer side of the bottom rail 13, and is rigidly secured to the bottom rail by suitable means, such as the bolt 24, so that it extends rearwardly from the bottom rail 13 substantially in longitudinal alignment with this corresponding bottom rail. The extension member 22 is similarly connected at its front end to the rear end of the other bottom rail and extends rearwardly therefrom in spaced apart and substantially parallel relationship to the extension member 23.

The extension members 22 and 23 are right angular cross sectional shape and have horizontally disposed bottom legs or flanges 25 and 26 which extend inwardly toward each other from the bottom edges of the side legs or flanges 27 and 28 which extend upwardly at the respectively opposite sides of the bale box extension. Flat cross members 29 and 30 extend between the extension members 22 and 23 at spaced apart locations along these extension members and are secured at their opposite ends to the extension member legs 25 and 26. At the ends of the extension members 22 and 23 remote from the rear end of the bale box 10, the bottom flanges 25 and 26 of these members are cut away from the corresponding side flanges 27 and 28 and are inclined downwardly from locations spaced from the rear ends of the extensions to the rear ends of these extensions to provide rearwardly and downwardly inclined ramps 31 and 32 along which the bales slide as the bales are discharged from the rear end of the extension. A flat cross member 33 extends between the ramps 31 and 32 at the rear ends of the ramps and is secured at its respectively opposite ends to the ramps 31 and 32 to support the bottom sides of the bales as the bales slide off of the rear end of the extension. At its opposite ends this cross member 33 is bent perpendicularly upwardly to provide legs, as indicated at 34 and 35, which are secured at their upper ends to the side legs 27 and 28 of the extension members 22 and 23 to firmly support the ramps 31 and 32 in their inclined position relative to the extension members 22 and 23.

A wicket 36 of rectangular shape is disposed above the bottom rail extensions 27 and 28 intermediate the length of these extensions and includes a substantially straight intermediate portion 37 having a length substantially equal to the distance between the side flanges of the top rails 11 and 12 of the bale box and substantially straight legs 38 and 39 extending perpendicularly from the respectively opposite ends of the intermediate portion 37 with their longitudinal center lines substantially in a common plane which also includes the longitudinal center line of the intermediate portion. At their ends remote from the intermediate portion 37 the legs 38 and 39 are connected to the side flanges of the bottom rail extension members 27 and 28 respectively, by suitable means, such as the bolts 40 and 41, and these are inclined upwardly and rearwardly from the corresponding bottom rail extension. An elongated brace 42 is connected at one end to the wicket leg 39 near the upper end of this leg and is connected at its other end to the top rail 12 of the baler for longitudinal adjustment relative to this top rail by suitable means, such as the bolt 43. This brace holds the wicket 36 at selected positions of inclination relative to the bottom rail extensions 27 and 28 with the intermediate portion 37 of the wicket substantially at the level of the top legs or flanges 14 and 15 of the top rails of the bale box.

With this arrangement, as a bale is forced rearwardly out of the discharge end of the bale box, it slides rearwardly along the flanges 25 and 26 of the extensions 22 and 23 until its midlength location passes the front ends of the ramps 31 and 32. At this time, the bale tips so that its end disposed outwardly of the rear end of the extension moves downwardly and its end nearest the bale box 10 moves upwardly and contacts the intermediate portion 37 of the wicket 36. The lower end of the bale will contact the ground slightly before its upper end contacts the upper portion of the wicket, so that engagement of the bale with the ground will drag the bale outwardly of the rear end of the extension and the wicket will hold the bale against tipping over or landing in an upright position with one end on the ground, the bale being gently deposited on the ground with the same side thereof in contact with the ground which constituted the bottom side of the bale, as the bale moves rearwardly through the bale box.

While the members 22 and 23 are illustrated as separate extension members connected to the bottom rails of the bale box, it is to be understood that in manufacturing a new baler, the bottom rails of the bale box may merely be extended rearwardly beyond the rear ends of the top rails to the proper extent without the use of separate extension members, and that even when installing the extension on an existing baler, the extension members may be welded to the rear ends of the bottom rails of the bale box to constitute integral parts of these bottom rails, without in any way exceeding the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a hay baler having a bale box including substantially parallel top rails and substantially parallel bottom rails spaced from and substantially parallel to said top rails; the improvement residing in bale guiding attachment means comprising an extension secured to said bottom rails having a pair of members, each of said members being in substantial longitudinal alignment with a corresponding bottom rail, ramp structures disposed one at the inner side of each of said members and inclined downwardly from locations spaced from the rear ends of said members to the rear ends thereof, said ramp structures being disposed rearwardly of the rear ends of said top rails, a U-shaped wicket having a substantially straight intermediate portion and substantially straight legs extending perpendicularly from the respectively opposite ends of said intermediate portion disposed above said extension members with its legs respectively connected at their ends remote from said intermediate portion to said bottom rails between said ramp structures and the rear ends of said top rails for engaging one end of a bale discharged from said bale box and holding the bale against turning or rolling as it slides along and off said ramp structures, and a brace connected between said wicket and one of said top rails to hold said wicket in position with its intermediate portion substantially at the level of the upper portions of said top rails.

2. In a hay baler including a bale box having top rails and bottom rails extending rearwardly of the rear ends of said top rails, the improvement residing in a bale guiding attachment means comprising an extension secured to said bottom rails having a pair of members, each of said members being in substantial longitudinal alignment with a corresponding bottom rail, downwardly and rearwardly inclined ramps disposed one at the rear of each of said members for supporting bales moving off the rear ends of said bottom rails, cross members extending between said members at spaced apart locations rearwardly of the rear ends of said top rails, and a wicket connected at its open end to said extension between said ramps and the rear ends of said top rails and extending upwardly from said extension and transversely of the space therebetween to the level of the upper portions of said top rails.

3. In a hay baler including a bale box having top rails and bottom rails extending rearwardly of the rear ends of said top rails, the improvement residing in a bale guiding attachment means comprising an extension secured to said bottom rails having a pair of members, each of said members being in substantial longitudinal alignment with a corresponding bottom rail, downwardly and rearwardly inclined ramps disposed one at the rear end of each of said members for supporting bales moving off the rear ends of said extension, a wicket connected at its open end to said members between said ramps and the rear ends of said top rails and extending upwardly from said members and transversely of the space therebetween to the level of the upper portions of said rails, and brace means connected between said wicket and said bale box supporting said wicket in an upwardly and rearwardly inclined position relative to said bottom rails.

References Cited in the file of this patent

UNITED STATES PATENTS

| Number | Name | Date |
|---|---|---|
| 1,441,352 | Johnson | Jan. 9, 1923 |
| 1,542,651 | Allessandro | June 16, 1925 |
| 1,677,490 | Raney et al. | July 17, 1928 |
| 1,749,843 | Roark | Mar. 11, 1930 |
| 2,410,516 | Messenger et al. | Nov. 5, 1946 |
| 2,431,892 | Russell | Dec. 2, 1947 |
| 2,531,560 | De Wall | Nov. 28, 1950 |
| 2,571,365 | Hughes | Oct. 16, 1951 |